(12) United States Patent
Hari et al.

(10) Patent No.: US 7,729,252 B2
(45) Date of Patent: Jun. 1, 2010

(54) METHODS AND DEVICES FOR PROVIDING FAST AND ROBUST OVERLOAD CONTROL

(75) Inventors: Adiseshu Hari, Matawan, NJ (US); Mehmet Karaul, Geneva (CH); Sneha Kasera, Eatontown, NJ (US); Thoma F. La Porta, State College, PA (US); Catherine R. Loader, Beachwood, OH (US); Jose Carlos Pinheiro, Chatham, NJ (US); Robert A. Latimer, Dennis, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1904 days.

(21) Appl. No.: 10/448,038

(22) Filed: May 30, 2003

(65) Prior Publication Data

US 2004/0240384 A1    Dec. 2, 2004

(51) Int. Cl.
  *H04J 3/14*    (2006.01)
(52) U.S. Cl. ...................................... 370/235; 370/248
(58) Field of Classification Search ................. 370/230; 455/445
See application file for complete search history.

(56) References Cited

U.S. PATENT DOCUMENTS 4,497,978 A *   2/1985   Schoute et al. .............. 379/279
4,974,256 A    11/1990   Cyr et al.
6,785,546 B1 *  8/2004   Djuric ........................ 455/445

OTHER PUBLICATIONS

Fast and robust signaling overload control Kasera, S.; Pinheiro, J.; Loader, C.; Karaul, M.; Hari, A.; LaPorta, T.; Network Protocols, 2001. Ninth International Conference on Nov. 11-14, 2001 pp. 323-331.*
"Specifications of Signaling System No. 7—Message Transfer Part.", ITU Recommendations Q.-701, 1993.
"Specifications of Signaling System No. 7—Message Transfer Part.", ITU Recommendations Q.-703, 1993.
"Specifications of Signaling System No. 7—Message Transfer Part.", ITU Recommendations Q.-704, 1993.
"Specifications of Signaling System No. 7—Message Transfer Part.", ITU Recommendations Q.-708, 1993.
Doshi et al, "Analysis of overload control schemes for a class of distributed switching machines", Proceedings, ITC-10, Montreal, Jun. 1983, Section 5.2, paper 2.
Floyd et al, "Random early detection gateways for congestion avoidance", IEEE/ACM Transactions on Networking 1 (4): 397-412, Aug. 1993.
Hajek, "External splitting of point processes", Mathematics of Operations Research 10: 543-556, 1985.
Schwarz, Telecommunications Networks: Protocols, Modeling and Analysis, Addison-Wesley, 1988.
Wallstrom, "A feedback queue with overload control", Proceedings, ITC-10, Montreal, Jun. 1983, Section 1.3, paper 4.

* cited by examiner

*Primary Examiner*—Seema S Rao
*Assistant Examiner*—Henry Baron
(74) *Attorney, Agent, or Firm*—John E. Curtin

(57) ABSTRACT

Techniques are provided for controlling overload conditions using two values; an acceptance rate fraction allowed value and an occupancy fraction allowed value. The inventive techniques allow quick response to the sudden onset of overload conditions, are robust enough to be used when processor speeds are increased and compare favorably to known techniques.

19 Claims, 8 Drawing Sheets

METHODS AND DEVICES FOR PROVIDING FAST AND ROBUST OVERLOAD CONTROL

BACKGROUND OF THE INVENTION

Telecommunication networks are made up of various "switches" interconnected by communication links. These links comprise two separate "logical" networks. One network carries voice and data, the other signaling and control information ("signaling network"). Switches communicate with each other over the signaling network to set up calls and other services.

Networks and switches are engineered to carry a certain number of active calls and to process requests for calls and services at a certain rate (hereafter referred to as the engineered capacity or just capacity). Occasionally, they might experience traffic that exceeds their engineered capacity. When this occurs a switch or network is said to be "overloaded", or in an "overload condition" or "congested" (collectively referred to sometimes as just "overload").

Controls are required to prevent or reduce overload in order to maintain a switch's throughput and quality of service at an acceptable level. Switches that are designed using appropriate overload controls are less expensive when compared to the less desired option of over-provisioning resources (e.g., building switches or networks with excess capacity to handle occasional overloads).

Within each switch there exists one or more control units or processors (collectively referred to as "processor(s)") that process incoming and outgoing signaling traffic (e.g., voice, data, etc . . . ). These processors can become overloaded due to sudden increases in signaling load and, therefore, need overload controls. Such controls must react to a large number of requests to avoid overwhelming the processor. Switches (and their respective processors) may experience signaling overload conditions even when voice and data networks are not congested. Ideally, the performance of a switch should be maintained at a level that is obtained at the engineered capacity.

Generally, there are two types of responses used by switches to control overload conditions. First, a switch may invoke remote overload controls by signaling neighboring switches that it is in an overload condition. Presumably these neighboring switches then limit signaling traffic to the overloaded switch or direct their traffic elsewhere. Although procedures exist to deal with such an "inter-switch" overload control response, in practice many deployed switches do not implement these procedures. Therefore, any practical solution to preventing or controlling overload or congestion-like conditions cannot necessarily depend on the behavior of neighboring switches.

The second type of response to an overload condition is for a switch to locally protect its own processing resources by selectively "throttling" (i.e., reducing, limiting, controlling) signaling messages. Each request to a switch, either to establish or release a connection, or to request a different type of service, usually results in a sequence of several messages, each of which must be processed in order for the request to be fulfilled. The process of throttling messages, therefore, may be carried out by throttling messages that initiate service requests. This reduces overload by eliminating future signaling messages.

Earlier work on overload control focused on preserving the performance of a switch under sustained overload conditions. Due to the increased number of service types in modern telecommunication networks and the introduction of mobile networks that often result in fast changing network "hot spots", overload control techniques must react quickly to be effective.

Presently, such controls are not quick enough to relieve overload or congestion-like conditions. In addition to being capable of reacting quickly to an overload condition, effective overload controls should also be highly "robust". That is, when a switch's processor is upgraded (i.e., to process faster messages) or when a switch's software is upgraded it is desirable to avoid having to reconfigure the switch's overload controls. The alternatives, that is re-configuring the switch with an alternative overload control technique or adopting an entirely different one, are highly undesirable.

Realizing they needed a fast and robust overload control technique the present inventors considered a number of existing techniques but found them all to be lacking in robustness or responsiveness.

One technique known as Occupancy demonstrated sufficient robustness but lacked the speed needed to eliminate real-time overload conditions. Nonetheless, because this technique provides a framework for introducing the techniques envisioned by the present invention it is worth discussing briefly. Occupancy is a so-called "processor-occupancy" based technique. It should be understood that the present invention also focuses on relieving an overload condition that presents itself to a processor.

A processor's occupancy, $\rho$, is defined as the percentage of time within a given measurement interval that a processor is busy processing tasks. Processor occupancy (hereafter "occupancy" for short) is a dimensionless quantity, which makes it relatively system independent.

In order to determine the amount of throttling needed to remove an overload condition, Occupancy first sets a threshold or target processor occupancy $\rho_{t\,arg}$. This threshold occupancy is then compared to an estimated processor occupancy at a particular measurement time. More specifically, using Occupancy, if an estimated processor occupancy at a measurement time n (given by the average of the last processor occupancies) is below $\rho_{t\,arg}$, the amount of traffic allowed to be received for processing by a processor (hereafter referred to as "fraction allowed" or "f" for short because it is some fraction of the incoming traffic which can be processed by a fully loaded switch) is increased. If the estimated processor occupancy is greater than the threshold occupancy, then the fraction allowed, f, is decreased. A feedback control function for the Occupancy technique is given by:

$$f_{(n+1)} = \begin{cases} f_{min}, & \phi_n f_n < f_{min} \\ 1, & \phi_n f_n > 1 \\ \phi_n f_n, & \text{otherwise.} \end{cases} \qquad (1)$$

where $\phi = \min(\rho_{t\,arg}/\rho, \phi_{max})$ and where a minimum fraction allowed $f_{min}$ is used to prevent a switch from throttling all incoming traffic. The term $\rho_{t\,arg}/\rho$ is referred to as the "occupancy value".

Suppose a given switch is configured to have an occupancy threshold of 80%. This means that if the switch's processor begins to process voice calls at a calls/sec rate equal to, or greater than 80% of the switch's processing capability, then the switch will be in an overload condition.

Suppose further that during a "first" time interval a processor actually begins to process calls at a calls/second rate equal to 90% of the switch's processing capability putting the switch, in fact, into such an overload condition. Using Occupancy, during a "next" or "second" time interval the switch must reduce the level of traffic it will be willing to receive for processing by approximately 11%.

In Occupancy, a processor's occupancy at any given time cannot exceed 100%. This requirement inherently limits how fast an overload condition can be reduced or eliminated because the maximum fraction allowed, f can decrease by, at most, $(1-\rho_{t\ arg})100\%$ between successive measurement times.

For example, if $\rho_{t\ arg}$=0.8, f can only decrease by 20% (at most) between measurement times. Hence, if the traffic (e.g., arriving signaling traffic) load is 200% of the engineered capacity then it will take 5 measurement intervals before the processor occupancy is brought below the threshold. Unfortunately, this implies that overload control based solely on Occupancy cannot react quickly to reduce an overload condition when such a condition is caused by sudden bursts of traffic.

Enter the techniques of the present invention. Not only are the techniques robust like Occupancy, but they are substantially faster in reducing or eliminating overload under different traffic conditions.

Accordingly, it is a desire of the present invention to provide fast and robust overload control techniques.

SUMMARY OF THE INVENTION

In accordance with the present invention, robust techniques are provided for quickly controlling overload under different traffic conditions including sudden bursts of signaling traffic. One such technique comprises a processor adapted to generate an acceptance rate fraction allowed value and an occupancy fraction allowed value, where the processor is further adapted to control an overload condition by selecting either value based on a determination that the selected value results in the greatest reduction in overload.

Additional features and functions of the present inventions will become apparent from the drawings, detailed description and claims that follow.

DETAILED DESCRIPTION OF THE INVENTION

Figure 1:
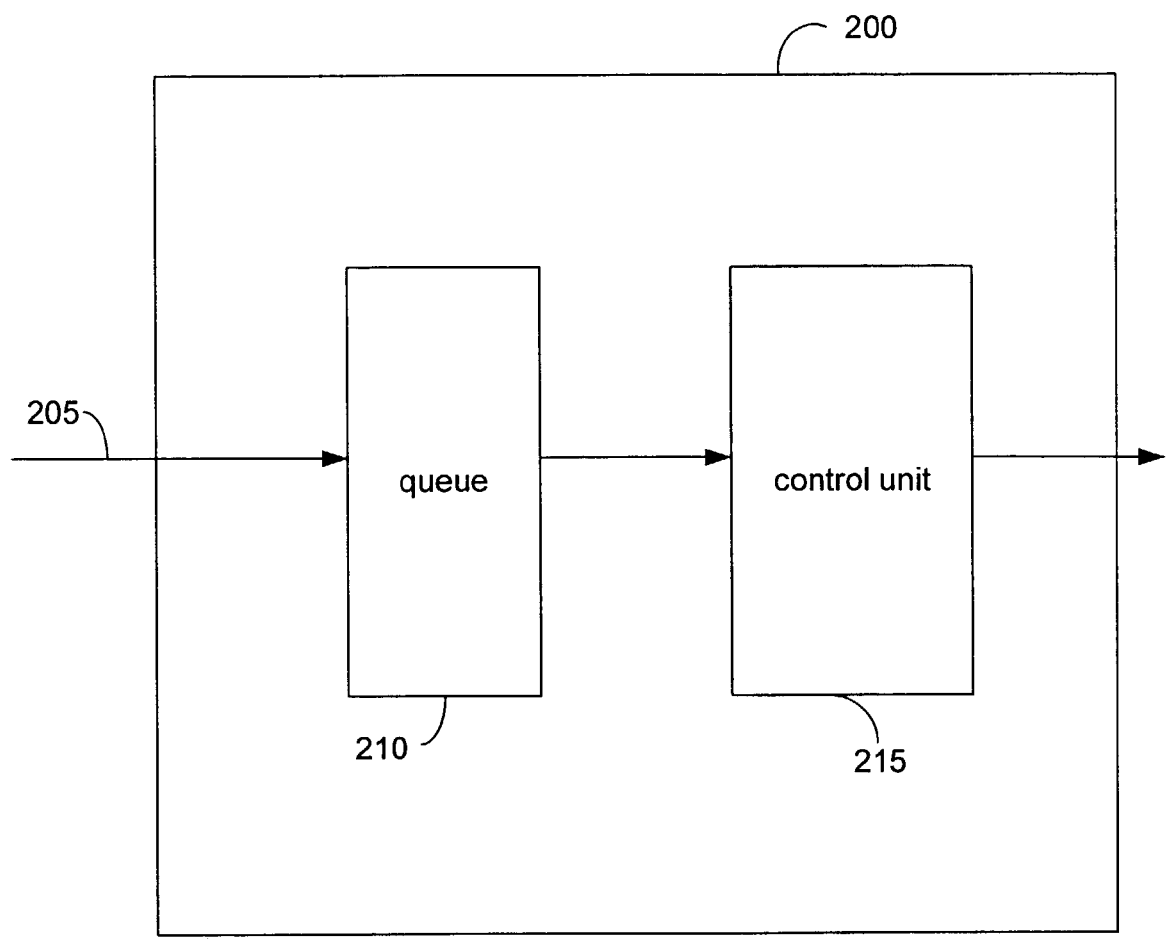
FIG. 1 is a simplified block diagram illustrating a communications switch according to one embodiment of the present invention.

The present invention provides fast and robust methods and devices for controlling overload conditions. The inventive techniques of the present invention will be referred to herein as Acceptance Rate Occupancy (ARO) techniques. This name is derived from the fact that the inventive techniques are based on the use of a new value, called "acceptance rate" and are partly patterned after Occupancy. ARO provides the robustness of Occupancy but adds the ability to resolve overload conditions rapidly, while maintaining an acceptable level of performance. The present invention envisions a processor adapted to implement the aforementioned inventive ARO techniques.

An ARO technique envisioned by the present invention makes use of two values: an occupancy value and an acceptance rate value. Acceptance rate is defined as the number of calls or service requests accepted to be processed during a given time interval. If accepted, a call or service request is eventually processed by the switch's processor.

In one embodiment of the present invention, an inventive ARO technique envisions the specification of a "target acceptance rate". This target acceptance rate is then compared to an estimated, real-time acceptance rate that may be dynamically estimated by the processor.

In more detail, if $\alpha_{targ}$ represents a target acceptance rate for a switch and $\hat{\alpha}_n$ an actual, estimated acceptance rate at a measurement time n (given by the average of the acceptance rates in the previous k measurement times or intervals), a feedback control function according to embodiments of the present invention can be defined as follows:

$$f_{(n+1)} = \begin{cases} f_{min}, & \phi_n f_n < f_{min} \\ 1, & \phi_n f_n > 1 \\ \phi_n f_n, & \text{otherwise} \end{cases} \quad (2)$$

where $\phi_n = \alpha_{targ}/\hat{\alpha}_n$ (hereafter referred to as "acceptance rate value").

It should be understood that a processor may be adapted to use a preset target acceptance rate $\alpha_{targ}$ based on the engineering capacity of the switch or may be adapted to dynamically estimate (i.e., in real-time) a target acceptance rate. The methodology used to dynamically generate $\alpha_{targ}$ depends on whether or not there is a processing cost associated with the throttling of new calls. When there is no processing cost, a processor may be adapted to estimate $\alpha_{targ}$ dynamically by determining the maximum system capacity $\mu_{max} = \hat{\alpha}/\rho$ where $\hat{\alpha}$, is the current estimate of a call acceptance rate and $\rho$ is a current estimate of processor occupancy. In yet another embodiment of the present invention, the target acceptance rate $\alpha_{targ}$, may be set to: $\alpha_{targ} = \rho_{t\ arg}\mu_{max}$ where $\alpha_{targ}$ is updated every K>>k interval, according to an exponentially weighted moving average having a small updating weight.

If, however, throttling costs are present under heavy overload conditions a substantial part of the processor's capacity may be used only for the throttling of new calls, and not for processing existing calls. Depending on the relative cost, a processor's available capacity should be determined to find $\mu_{max}$.

Acceptance rate-based overload controls like those just described are effective to control overload conditions caused by the receipt of a high volume of external traffic (e.g., call requests). As recognized by the present inventors, overload may be caused by internal conditions as well. For example, overload may be caused by increases in the "service time" for certain calls (e.g., land-line calls versus wireless calls) or by the consumption of a processor's resources due to the need to process background tasks. Overload conditions caused by such activity cannot be corrected by simply using acceptance rate-based, overload controls. Accordingly, the present invention envisions overload control techniques which combine the advantages realized using an acceptance rate-based technique with those realized using an Occupancy-based technique.

In sum, the present invention envisions generating two separate values: an acceptance rate fraction allowed value to deal with heavy, sudden external call volumes and an Occupancy-based, occupancy fraction allowed value to deal with overload caused by steady high load and internal processing tasks, etc. It is the combined use of these values that the inventors refer to as ARO. The generation of an Occupancy-based, occupancy fraction allowed value has already been discussed above and, therefore, will not be repeated here.

As envisioned by the present invention, once both values are generated by a processor or the like, the processor is further adapted to compare both values and to select the value which results in the greatest reduction in overload. For example, both values may be given in terms of a fraction allowed, f, then $f = \min(f_A, f_O)$, where $f_A$ and $f_O$ are the fraction allowed using an acceptance rate or occupancy feedback control function, respectively.

Referring now to FIG. 1, there is shown a simplified block diagram of a switch 200 adapted to implement the ARO techniques of overload control described above and below. In this embodiment, switch 200 is adapted to receive traffic or tasks 205. Switch 200 comprises a queue 210 for storing such traffic or tasks. Switch 200 is operable to accept or deny new traffic or tasks using the inventive ARO techniques to quickly eliminate overload on processor 215.

In accordance with the discussion above, in one embodiment of the present invention, the processor 215 is adapted to generate an acceptance rate value and an occupancy value.

For example, if during a first-time interval the rate of new call requests measured by the processor 215 equals 180 calls/sec then the estimated acceptance rate is 180 calls/sec as well. If the target acceptance rate is 100 calls/sec, then the acceptance rate value is 100/180 or 0.55. This acceptance rate value is used to generate an acceptance rate fraction allowed using equation (2). Assuming that the acceptance rate fraction allowed has an initial value of 1, the acceptance rate fraction allowed using the acceptance rate value of 0.55 is 0.55.

Though shown and described as fractions, it should be understood that the acceptance rate value and acceptance rate fraction allowed value are not so limited. Alternatively, they may be converted, for example, into whole numbers, provided the new numbers accurately reflect the original values.

Switch 200 may be further operable to measure the estimated acceptance rate and target acceptance rate in real-time during every given time interval or at every given measurement time.

Continuing, the processor 215 is further adapted to generate an occupancy value. The processor 215 generates this value by comparing an occupancy threshold to an estimated occupancy.

Using the hypothetical call rate of 180 calls/sec, it will be assumed for present purposes that such a call rate would result in an estimated occupancy rate which would equal or exceed 100% of processor's 215 processing capacity. Accordingly, processor 215 is adapted to generate an occupancy value equal to 80÷100, or 0.80. The occupancy value is used to generate an occupancy fraction allowed using equation (1). Assuming that the initial occupancy fraction allowed value is 1, the occupancy fraction allowed value using occupancy value of 0.55 is 0.55. As is the case for the acceptance rate and acceptance rate fraction allowed value, the occupancy value and occupancy fraction allowed value may be represented by some number or value other than a fraction.

At this point, the processor 215 has generated two values: an acceptance rate fraction allowed value of 0.55 and an occupancy fraction allowed value of 0.80.

After these two fraction allowed values are generated, the control unit 215 is further adapted to compare these two values and to select the value which will provide the greatest reduction in overload. In one embodiment of the present invention, the processor 215 is adapted to select the lesser of the two values, thereby ensuring that the lowest amount of traffic or tasks will be processed leading to the greatest reduction in overload. In the example given above, the lesser of the two values is 0.55. During the next time interval, the processor 215 is further adapted to limit the amount of traffic and tasks which will be processed to 0.55 or 55%, thereby eliminating overload during the second or next time period. In yet another embodiment of the invention, switch 200 or processor 215 may be further operable to select a first value representing a percentage of the acceptance rate fraction allowed value and a second value representing a percentage of the occupancy fraction allowed value to control the overload condition.

It should be understood that the techniques envisioned by the present invention may be applied to both voice-based communication traffic and data-based communication traffic.

Figure 2:
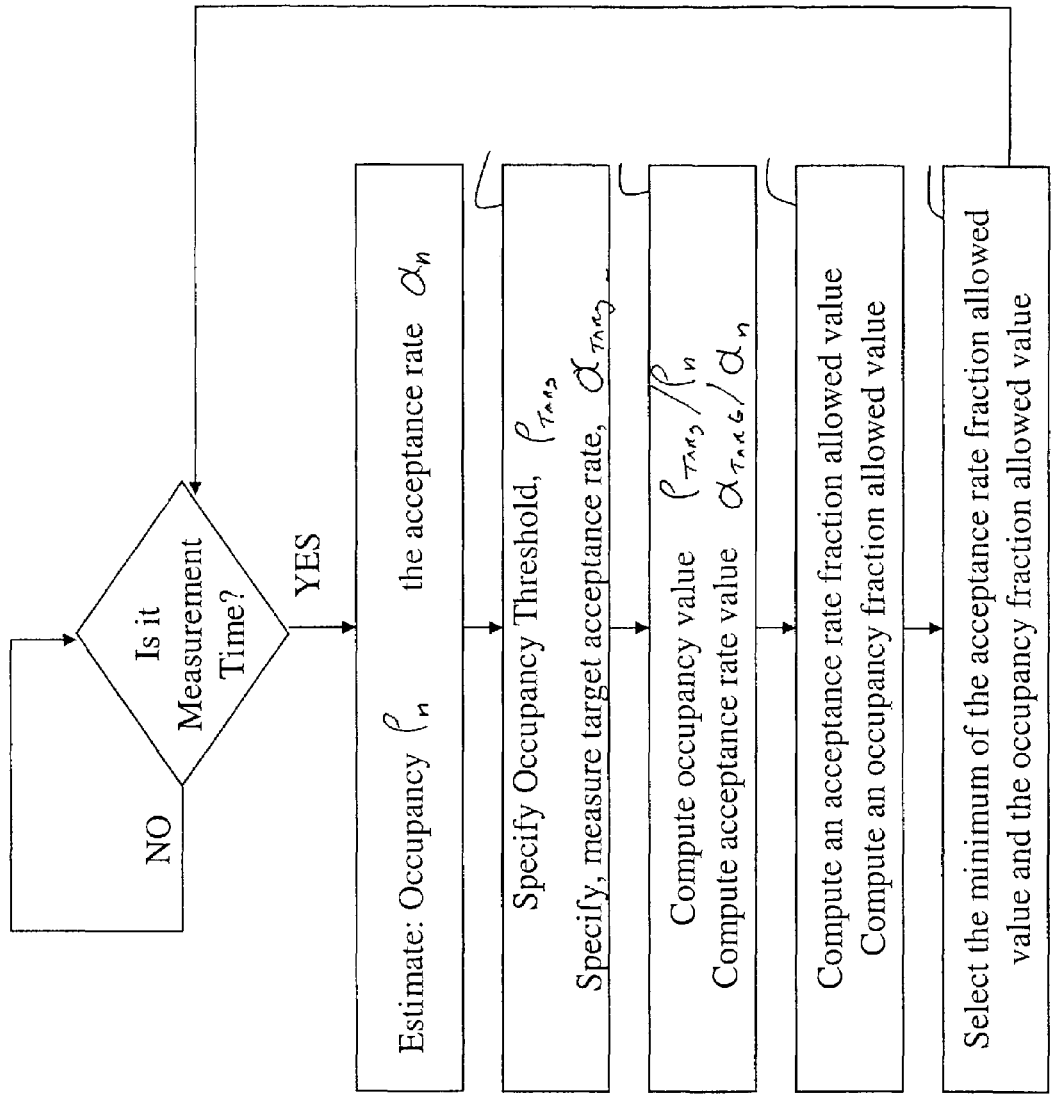
FIG. 2 is a flow diagram illustrating a technique for controlling overload conditions according to one embodiment of the present invention.

A simplified flow diagram of the ARO technique discussed above is illustrated in FIG. 2.

The techniques envisioned by the present invention produce favorable results when compared to techniques in use today and other proposed techniques. One such proposed technique is known as the Random Early Discard (RED) technique. Greatly simplified, the ARO techniques proposed by the present invention are "time-interval" techniques while RED is an "event driven" technique. That is, in RED a processor is adapted to determine whether an overload condition exists for each received "event" (e.g., when each call is received), while in ARO the values discussed above are generated after a given time period during which a number of so-called events may occur. Thus, one advantage of ARO is that a processor's processing capacity is not consumed in measuring system load for each and every event.

In addition, the ARO techniques proposed by the present invention use "deterministic" throttling schemes while RED uses "probabilistic" throttling schemes. A detailed description of throttling schemes is not necessary for an understanding of the present invention. However, in order to compare "apples-to-apples", that is, to compare the ARO techniques of the present invention to the proposed RED technique, it was necessary for the present inventors to modify the RED technique to be both time-interval based and to use a deterministic throttling scheme. To that end, the present inventors developed a new technique that they named Signaling Red (SRED). SRED is analogous to RED except for the modifications just mentioned.

Though future developments may envision the use of the SRED technique created by the present inventors for overload control (e.g., by execution of a program or programs), presently the SRED technique has been developed to compare ARO techniques to those of RED. What follows is a discussion of the results achieved using the ARO techniques when compared to SRED. In addition, results obtained using both the ARO and SRED techniques are also compared to a conventional Occupancy technique.

Figure 3:
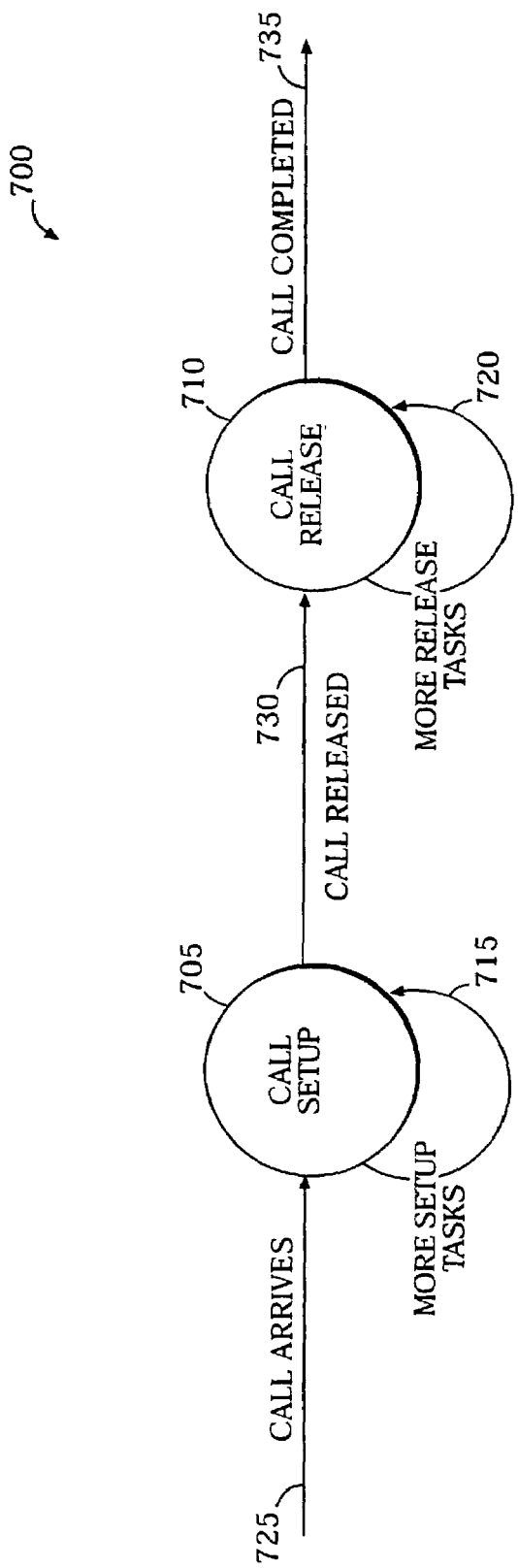
FIG. 3 is a simplified diagram illustrating a call setup and event methodology used to compare overload techniques envisioned by the present invention to other techniques.

FIG. 3 is a diagram illustrating a call setup and event methodology that was used to carry out simulations in order to compare all three techniques. To simplify the methodology, it was assumed that the process of detecting an overload condition was free. The call model used treats each arriving call request as consisting of two task segments: call setup and call release. An arriving call arrives via input 725, is communicated by call setup unit 705 to call release unit 710 via pathway 730 and is completed and output at 735. The call setup and call release units are operable to complete several tasks after a random delay. For simplicity subtasks are combined, occurring with negligible delay of each other, into one subtask that results in call setup being subdivided into three subtasks and call termination being composed of a single subtask.

A processor used to carry out the simulations was designed to operate at approximately 95% occupancy under a load of 1.9 million busy hour call attempts (BHCA), corresponding to an average of about 528 call attempts per second. The probability distributions used for the delays until the next subtask, and the subtask processing times are listed in Table 1 below, where exp ($\lambda$) denotes the exponential distribution of parameter $\lambda$ and $\Gamma(\alpha,\beta)$ denotes the Gamma distribution of parameters $\alpha$ and $\beta$.

TABLE 1

| TASK | NUMBER | DELAY EXP $\lambda$ | PROC. T(d, B) | Mean |
|---|---|---|---|---|
| Setup | 1 | Exp(250) | $\Gamma$ (3, 30/11) | 1.1 |
|  | 2 | Exp(7500) | $\Gamma$ (2, 10) | 0.2 |
|  | 3 | Exp(90000) | $\Gamma$ (2, 10) | 0.2 |
| Release | 1 | — | $\Gamma$ (2, 20/3) | 0.3 |

The choice of distribution values in Table 1 are based on traffic engineering recommendations and measurements for wire line switches. Under these assumptions, the total average processing time per call is 1.8 milliseconds. Thus, 100% capacity would be about 556 calls/s, or about two million BHCA. The holding time for a call, that is, the time between the end of a call setup and the start of a call termination, is assumed to be exponentially distributed with a mean of 90 seconds. It is assumed that new calls arrive according to a Poisson process. To measure how fast each technique might react to an overload condition caused by a sudden increase in new call arrivals, the mean arrival rate was increased over a short time interval.

All overload techniques considered used the same intervals, 100ms, and the same minimum fraction allowed, $f_{min}=0.005$. Table 2 lists the parameters and values used in the simulations for different techniques. A detailed discussion of each of these parameters is beyond the scope of the present invention and is not necessary for an understanding of the claimed inventions.

TABLE 2

|  | TECHNIQUE | | |
|---|---|---|---|
| PARAMETER | OCCUPANCY | SRED | ARO |
| $P_{targ}$ | 0.95 | — | 0.95 |
| $\Phi_{max}$ | 20 | — | 20 |
| K | 10 | 1 | 10 |
| $\Omega$ | — | 0.05 | 0.02 |
| K | — | — | 300 |
| $Q_{min}$ | — | 3 | — |
| $Q_{max}$ | — | 8 | — |

The values chosen for the SRED technique produce an average processor occupancy of approximately 95% under mild to moderate overload conditions (a call rate between 550 and 1500 calls/s), with no throttling costs. The performance of SRED deteriorates under high overload conditions (call rates above 2000 calls/s) making it difficult to choose values that give a steady 95% occupancy for the range of call rates considered in the simulations.

The performance metrics used to compare the techniques were "task delay" (time in queue until start of processing), "call throughput" and "fraction of calls allowed". In order to assure stability under a steady load, the techniques were also tested under such conditions. Steady call attempt rates varying between 1.5 million BHCA (417 calls/s) and 9 million BHCA (2500 calls/s), covering the range from non-overload to severe overload conditions (with an assumed nominal load of 2 million BHCA) were used to simulate steady loads. For each call attempt rate, calls were simulated over a 30-minute period, with performance metrics measured at each measurement time and then averaged over the whole period.

Figure 4:
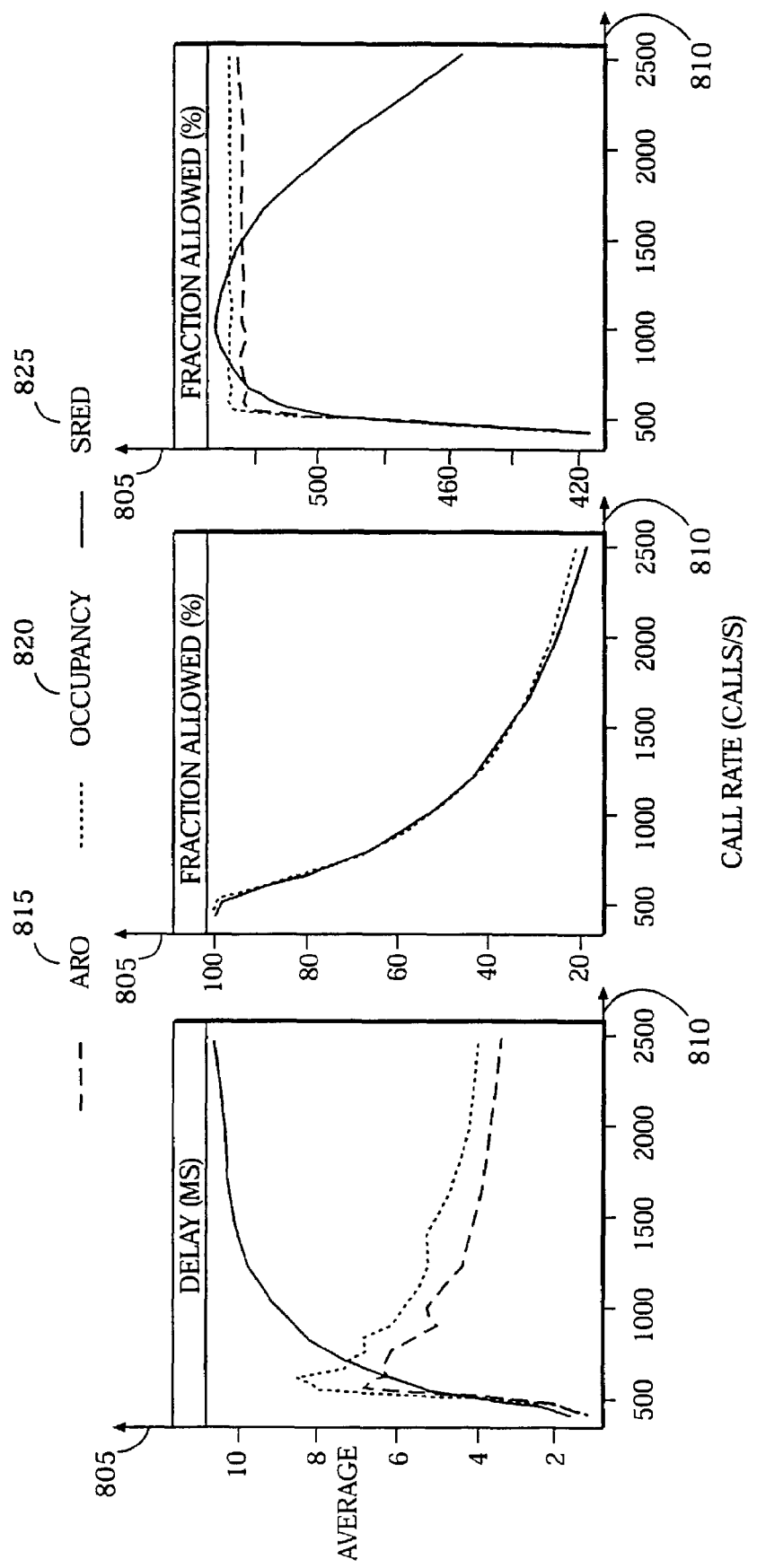
FIG. 4 are graphs illustrating average performance metrics versus call attempt rates for three different overload control techniques.

FIG. 4 depicts a comparison of the average performance metrics (on the y-axis) versus call attempt rate (on the x-axis) for the ARO 815, Occupancy 820, and SRED 825 techniques. The ARO 815 and Occupancy 820 techniques performed well (and similarly) with respect to the performance metrics considered. The SRED 825 technique had comparable performance up to a call attempt rate of 1500 calls (with larger average task delays), but its performance deteriorated at higher call attempt rates (at 2500 calls, its average processor occupancy was 82% and its average throughput was 457 calls/s, about 50 calls/sec less than the average throughput for ARO 815 and Occupancy 820). It should be noted that the actual RED method is designed to work with IP networks, where it can be safely assumed that remote overload control mechanisms will prevent a device from reaching the overload levels considered in the simulations described herein. In the context of signaling networks, however, such an assumption cannot be made and one needs to consider the behavior of overload control techniques under severe overload conditions.

The loss in performance for SRED 825 under high call attempt rates seems to be related to the instability of its feedback mechanism during such conditions, which in turn causes the fraction of calls allowed to very greatly.

Figure 5:
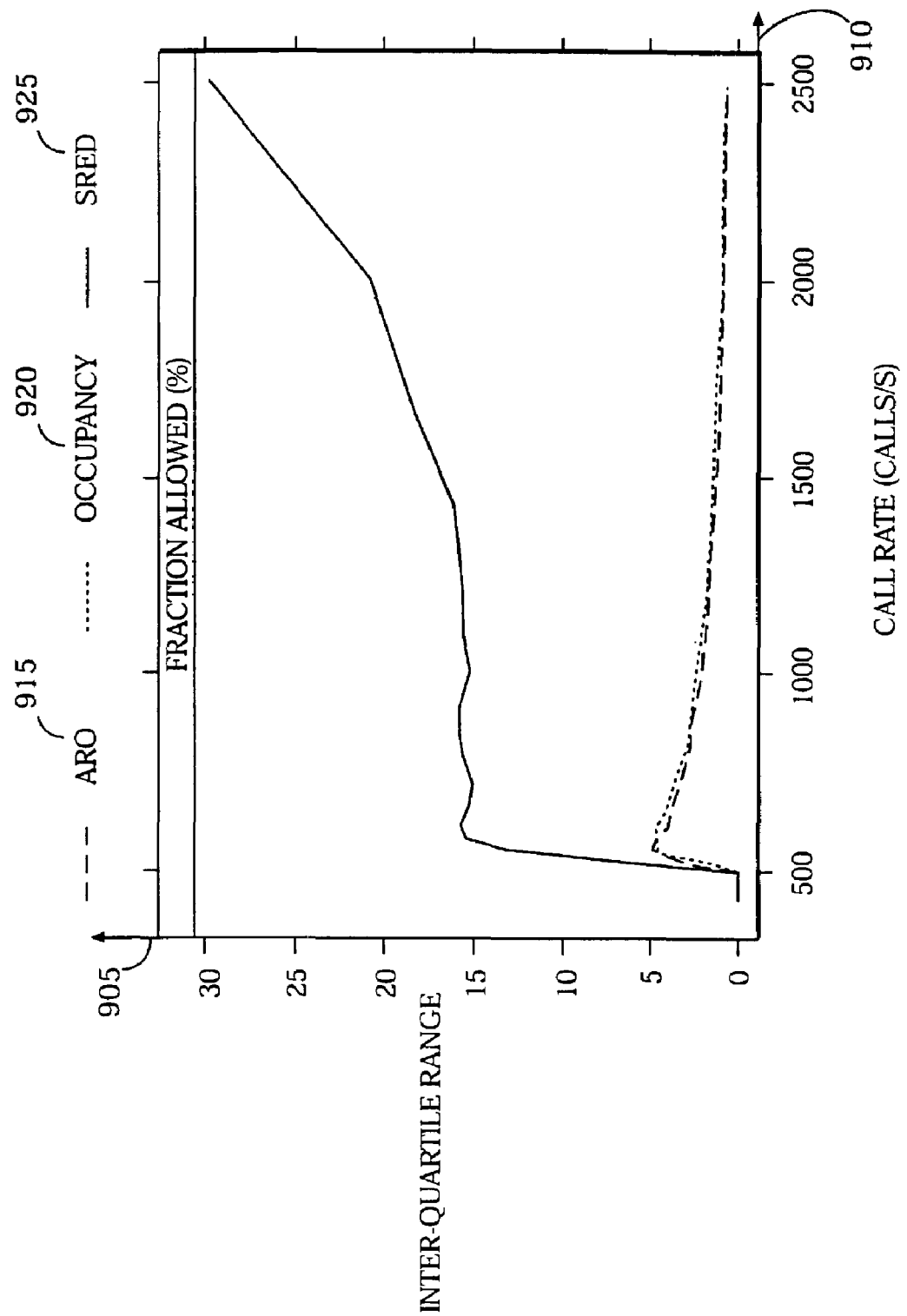
FIG. 5 is a graph illustrating inter-quartile ranges of fraction allowed versus call attempt rates for three different overload control techniques.

FIG. 5 is a graph illustrating inter-quartile ranges (i.e., the difference between the third and the first quartiles, which provides a measure of variation for the variable under consideration) of the fractions allowed, observed over time during a simulation, for different call attempt rates. The variation in SRED's 925 fraction allowed is about ten times larger under heavy overload conditions than the variations corresponding to the other two techniques. In order to further explore this issue, the behavior of the techniques over time was studied.

Figure 6:
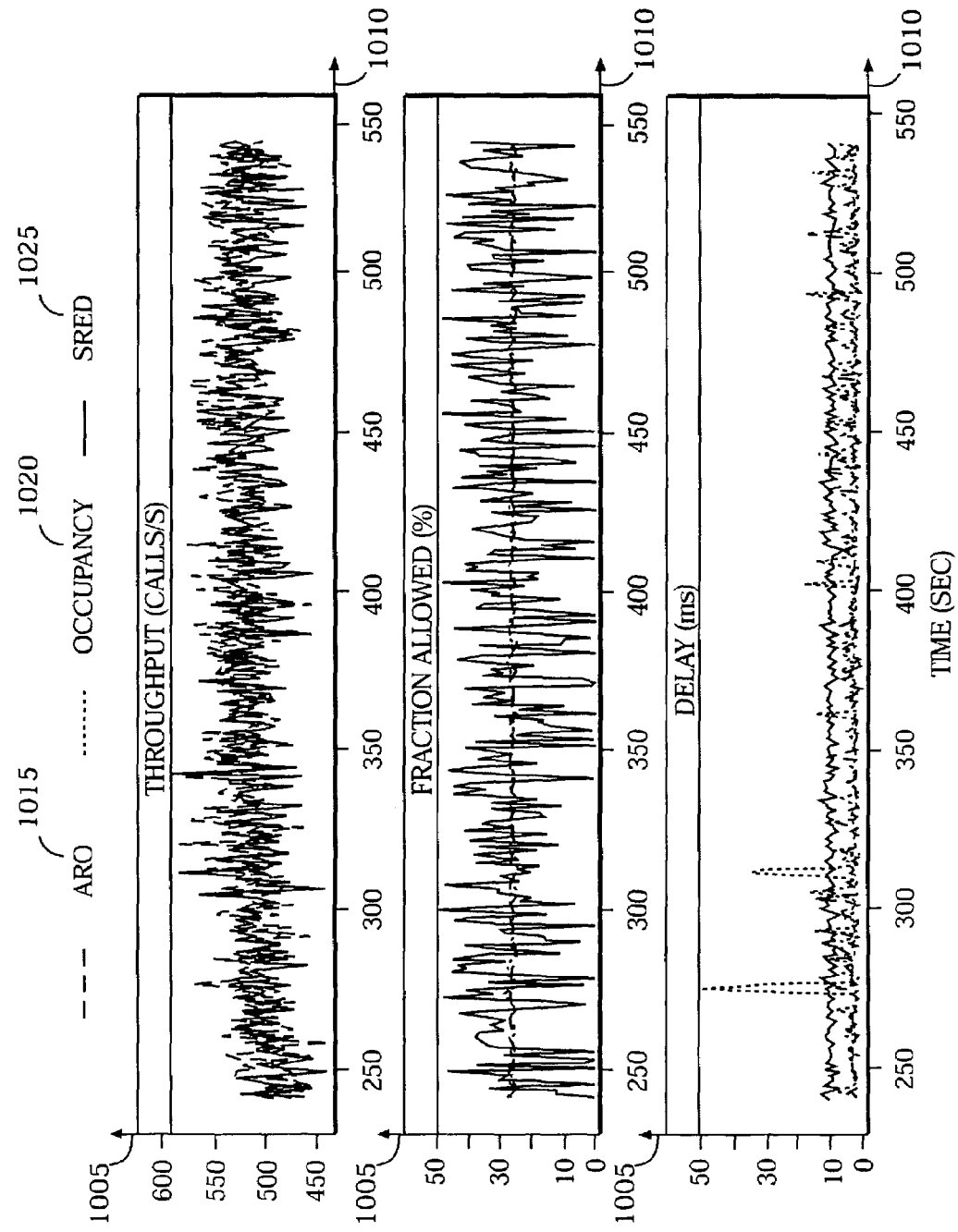
FIG. 6 are graphs illustrating the evolution of performance metrics (given as an average per second), after the third minute of operation, for three different overload control techniques.

Consider the case of a steady state call rate of 7.2 million BHCA (2000 calls/s) considerably above the nominal capacity of 2 million BHCA (556 calls/s). FIG. 6 depicts graphs illustrating the evolution of performance metrics (given as an average per second), after the third minute of operation, for the ARO 1015, Occupancy 1020 and SRED 1025 techniques. The ARO 1015 and Occupancy 1020 techniques display similar, acceptable performances with respect to all three metrics with Occupancy 1020 showing more variability with respect to task delay. The SRED technique displays consistently higher (but less variable) task delay, but substantially more variation in fraction allowed. As mentioned, this leads to a decrease in average throughput (less than 2 million BHCA ... the average throughput is about 525 calls/s for ARO and Occupancy and about 500 calls/s for SRED). At this overload level, SRED performance begins to show clear signs of deterioration, as indicated in FIGS. 4-6.

In additional simulations, the call rate was operated at 1.8 million BHCA for 300 seconds, at which point the call rate was increased to 7.2 million calls/s over a period of 1.5 seconds, stayed at that level for two minutes, and then dropped back to 1.8 million BHCA over a period of 1.5 seconds. The goal was to study how fast each overload technique would react to a sudden onset, and then cessation of, overload conditions.

Figure 7:
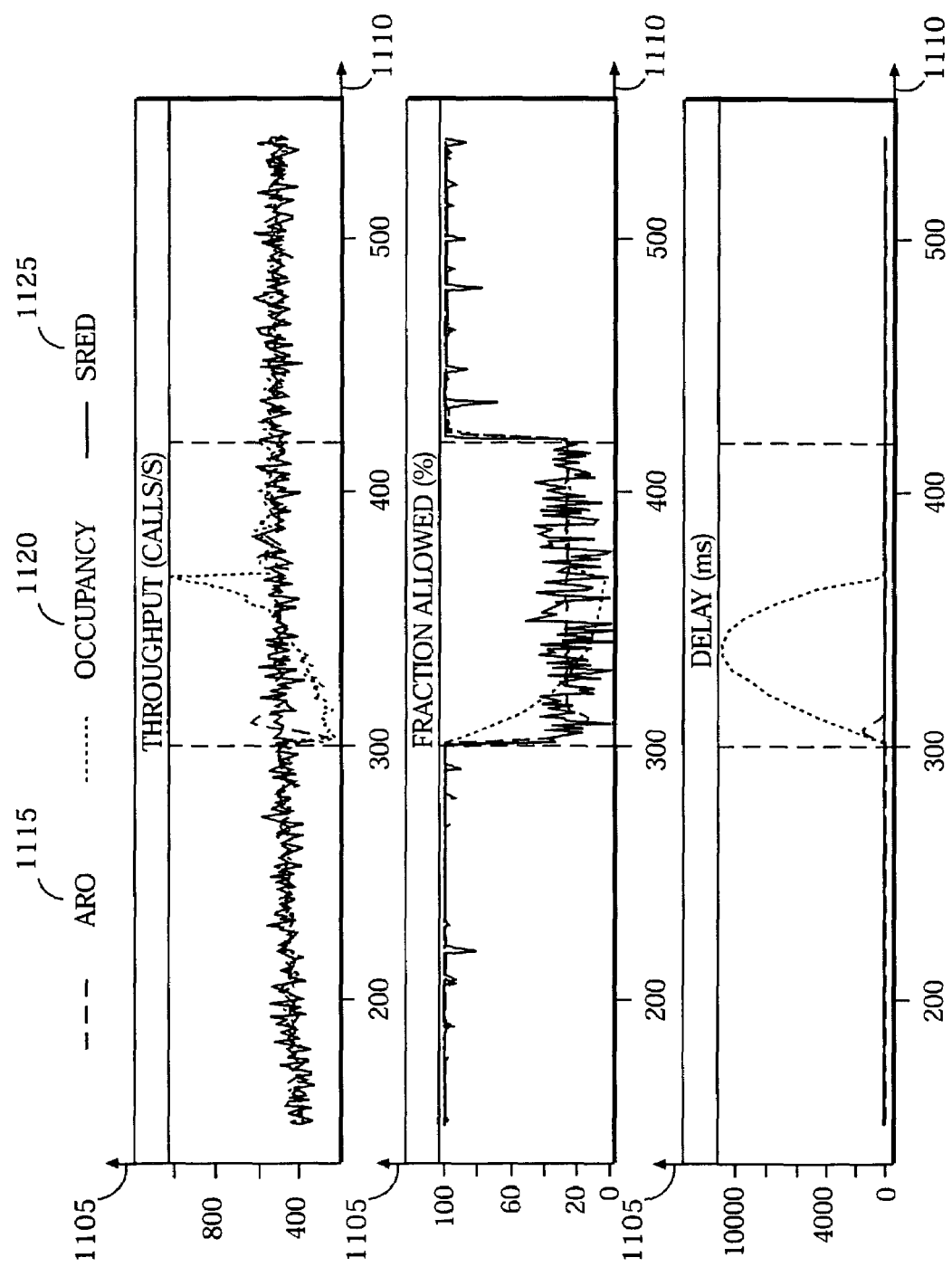
FIG. 7 are graphs illustrating the evolution of performance metrics under a non-steady overload for three different overload control techniques.

FIG. 7 depicts graphs illustrating the evolution of performance metrics under non-steady overload conditions for the ARO 1115, Occupancy 1120, and SRED 1125 techniques. The SRED 1125 technique demonstrated the best overall performance with respect to task delay under this scenario. The Occupancy 1120 technique has the worst performance, taking more than one minute to recover from an increase in call rate, experiencing delays up to 11 seconds. The ARO 1115 technique performed better than the Occupancy 1120 technique, but not quite as good as SRED 1125; about 12 seconds to recover and a maximum delay of 1.5 seconds. Once again, however, the SRED 1125 technique's fraction allowed varied greatly under overload conditions, something which was not observed for the other two techniques. All three techniques showed almost immediate recovery when the load condition at the switch changed from an overload to non-overload.

There are two main reasons that SRED 1125 performed better as it relates to task delay; a greater sensitivity to queue length overload conditions, the measurement used in SRED, and the fact that k=1 (i.e., the fraction allowed changed at every interval). To get a fairer comparison, while keeping a reasonable variation in fraction allowed, versions of ARO 1115 and Occupancy 1120 were generated with k=3, hereafter referred to as ARO-3 and Occupancy-3, respectively.

Figure 8:
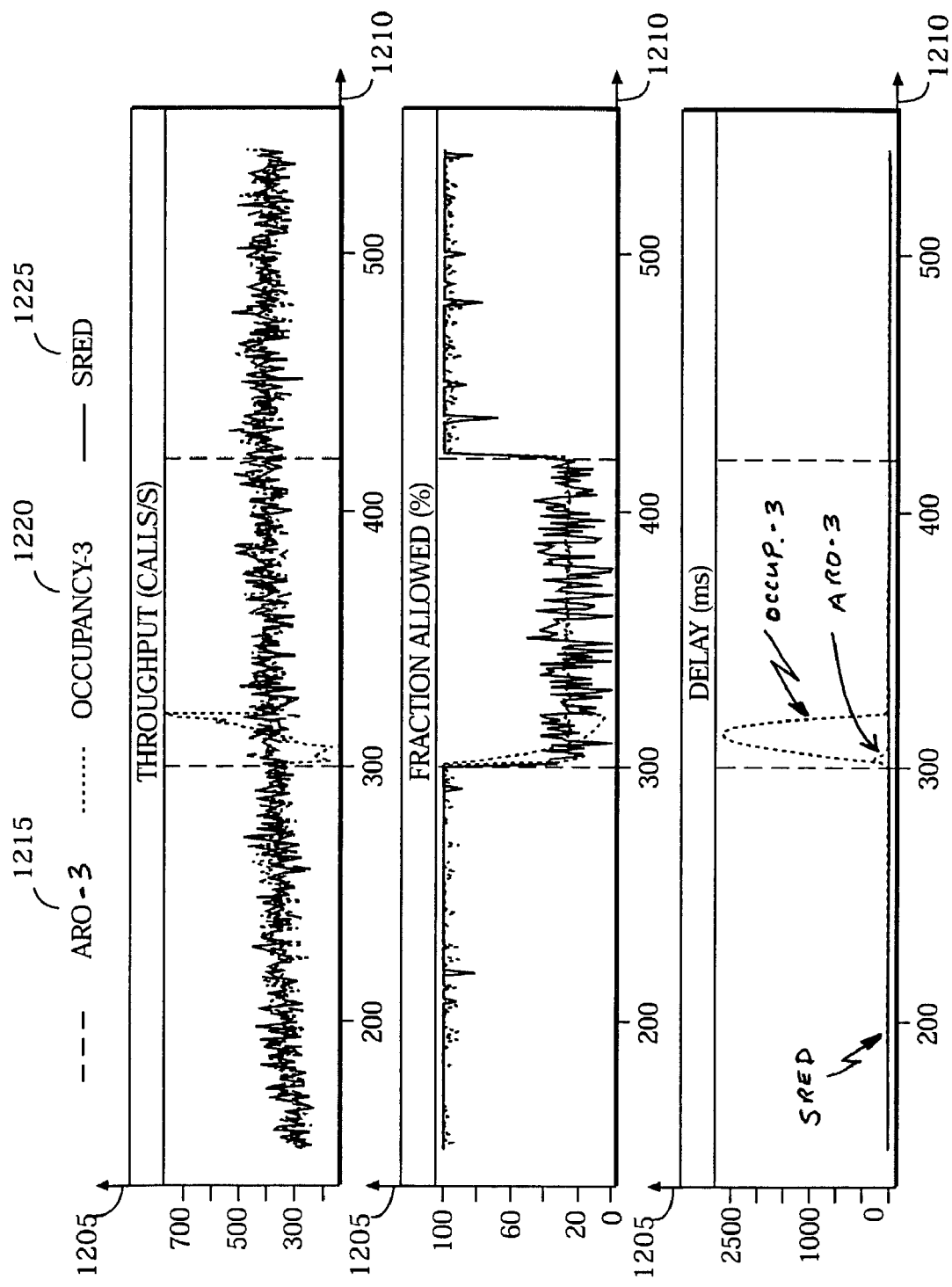
FIG. 8 are graphs illustrating the evolution of performance metrics under a non-steady overload for alternatives of some of the techniques illustrated in FIG. 7.

FIG. 8 depicts graphs illustrating the performance under non-steady overload conditions of ARO-3 1215, Occupancy-3 1220, and SRED 1225. As shown, the task-delay performance of ARO-3 1215 is now nearly identical to that of SRED 1225; 3 seconds of recovery time and a maximum task delay of 245 ms. Occupancy-3 1220 demonstrates much better task-delay performance than the original Occupancy technique (a recovery time of 20 seconds and a maximum delay of 3.1 seconds), but is still substantially worse than the other two techniques. The basic reason for this is a greater latency in processor occupancy as a measure of overload, compared to either queue length or call acceptance rate. As expected, the use of k=3 for ARO and Occupancy also resulted in greater feedback variability, but this variability is similar to that of SRED 1225 under non-overload conditions and much smaller in the case of fraction allowed during overload. Alternative values of k may be used to strike a better balance between speed of reaction and feedback variability for ARO and Occupancy.

The overload control techniques which should be used under various overload conditions are summarized in Table 3:

TABLE 3

| OVERLOAD CONDITION | RECOMMENDED TECHNIQUES |
| --- | --- |
| Steady Overload Condition | ARO and Occupancy Methods (see FIG. 4 and FIG. 5) |
| Sudden Bursts of Load (Non-Steady Overload Condition) | ARO and SRED Methods (see FIG. 7 and FIG. 8) |

In summary, overload conditions due to sudden increases in traffic and tasks are best controlled using ARO and SRED because they reduce the amount of time needed to respond to an overload condition by orders of magnitude in comparison to Occupancy. In comparison to SRED, ARO takes slightly longer to respond when sudden increases in traffic or tasks occur, but allows for higher throughput under heavy overload conditions.

The ARO overload techniques envisioned by the present invention are designed to react quickly to sudden overload conditions (e.g., bursts of load). Using simulations, these techniques have produced superior results when compared to conventional (i.e., Occupancy) and other proposed (i.e. RED) techniques.

Even though ARO requires measurement of two parameters, in comparison to one in the case of SRED, ARO only requires the specification of one parameter; a threshold occupancy. This threshold is dimensionless and does not change when a switch is upgraded with a faster processor or when a processor's software is upgraded to allow it to process traffic faster, making ARO very robust.

Alternative embodiments will become apparent to those skilled in the art to which the present invention pertains without departing from its spirit and scope. For example, in yet another embodiment of the present invention, the ARO techniques described above may be extended to a network of switches. Alternatively, a single switch may offer different classes of calls, some more important than the others. For example, in yet a further embodiment, the inventive overload techniques may be carried out by a processor or the like in a wireless switch where different traffic types (e.g., location updates, short message services) are given different priorities with respect to regular voice calls.

The foregoing description has attempted to set forth some examples of the present invention. The scope of the present invention, however, is described by the claims, which follow, supported by the foregoing detailed description.

We claim:

1. A communications device for controlling an overload condition comprising a processor operable to:
    generate an acceptance rate fraction allowed value by comparing an estimated acceptance rate to a target acceptance rate,
    generate an occupancy fraction allowed value by comparing an estimated occupancy to a threshold occupancy, and
    select the lesser of the acceptance rate fraction allowed value and occupancy fraction allowed value to control the overload condition.

2. The device as in claim 1 wherein the device comprises a communications switch.

3. The device as in claim 1 wherein the processor is further operable to select either value after a measured interval of time.

4. The device as in claim 1 wherein the processor is further operable to apply the selected value during a next time interval.

5. The device as in claim 1 wherein the target acceptance rate comprises a preset acceptance rate.

6. The device as in claim 1 wherein the processor is further operable to generate a dynamic, target acceptance rate based on a processing cost.

7. The device as in claim 1 wherein the processor is further operable to select a first value representing a percentage of the acceptance rate fraction allowed value and a second value representing a percentage of the occupancy fraction allowed value to control the overload condition.

8. A method for controlling an overload condition comprising:
   generating an acceptance rate fraction allowed value by comparing an estimated acceptance rate to a target acceptance rate;
   generating an occupancy fraction allowed value by comparing an estimated occupancy to a threshold occupancy; and
   selecting the lesser of the acceptance rate fraction allowed value and occupancy fraction allowed value to control the overload condition.

9. The method as in claim 8 further comprising selecting the value after a measured interval of time.

10. The method as in claim 8 further comprising applying the selected value during a next time interval.

11. The method as in claim 8 wherein the target acceptance rate comprises a preset acceptance rate.

12. The method as in claim 8 further comprising generating a dynamic, target acceptance rate based on a processing cost.

13. The method as in claim 9 further comprising selecting a first value representing a percentage of the acceptance rate fraction allowed value and a second value representing a percentage of the occupancy fraction allowed value to control the overload condition.

14. A processor for controlling an overload condition, the processor operable to:
   generate an acceptance rate fraction allowed value by comparing an estimated acceptance rate to a target acceptance rate;
   generate an occupancy fraction allowed value by comparing an estimated occupancy to a threshold occupancy; and
   select the lesser of the acceptance rate fraction allowed value and occupancy fraction allowed value to control the overload condition.

15. The processor as in claim 14 wherein the processor is further operable to select either value after a measured interval of time.

16. The processor as in claim 14 wherein the processor is further operable to apply the selected value during a next time interval.

17. The processor as in claim 14 wherein the target acceptance rate comprises a preset acceptance rate.

18. The processor as in claim 14 further operable to generate a dynamic, target acceptance rate based on a processing cost.

19. The processor as in claim 14 wherein the processor is further operable to select a first value representing a percentage of the acceptance rate fraction allowed value and a second value representing a percentage of the occupancy fraction allowed value to control the overload condition.

* * * * *